United States Patent
Sen et al.

(10) Patent No.: US 11,663,001 B2
(45) Date of Patent: May 30, 2023

(54) FAMILY OF LOSSY SPARSE LOAD SIMD INSTRUCTIONS

(71) Applicant: Advanced Micro Devices, Inc., Santa Clara, CA (US)

(72) Inventors: Sanchari Sen, West Lafayette, IN (US); Derrick Allen Aguren, Austin, TX (US); Joseph Lee Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/194,981

(22) Filed: Nov. 19, 2018

(65) Prior Publication Data

US 2020/0159529 A1 May 21, 2020

(51) Int. Cl.
*G06F 9/30* (2018.01)
*G06F 9/38* (2018.01)
*G06F 17/16* (2006.01)
*G06N 3/04* (2023.01)

(52) U.S. Cl.
CPC ...... *G06F 9/30014* (2013.01); *G06F 9/30036* (2013.01); *G06F 9/3887* (2013.01); *G06F 17/16* (2013.01); *G06N 3/04* (2013.01)

(58) Field of Classification Search
CPC .... G06F 17/16; G06F 9/3887; G06F 9/30036; G06F 15/8061; G06F 9/30014; G06F 17/30069
See application file for complete search history.

(56) References Cited

U.S. PATENT DOCUMENTS

| 6,094,718 A * | 7/2000 | Tanaka | G06F 9/30069 |
| | | | 712/34 |
| 10,572,568 B2 * | 2/2020 | Narayanamoorthy | |
| | | | G06F 9/30043 |
| 10,817,260 B1 * | 10/2020 | Huang | G06F 7/50 |

(Continued)

OTHER PUBLICATIONS

Mao, Huizi & Han, Song & Pool, Jeff & Li, Wenshuo & Liu, Xingyu & Wang, Yu & Dally, William. Exploring the Regularity of Sparse Structure in Convolutional Neural Networks. (Year: 2017).*

(Continued)

*Primary Examiner* — Keith E Vicary
*Assistant Examiner* — Kasim Alli
(74) *Attorney, Agent, or Firm* — Kowert Hood Munyon Rankin and Goetzel PC; Rory D. Rankin

(57) ABSTRACT

Systems, apparatuses, and methods for implementing a family of lossy sparse load single instruction, multiple data (SIMD) instructions are disclosed. A lossy sparse load unit (LSLU) loads a plurality of values from one or more input vector operands and determines how many non-zero values are included in one or more input vector operands of a given instruction. If the one or more input vector operands have less than a threshold number of non-zero values, then the LSLU causes an instruction for processing the one or more input vector operands to be skipped. In this case, the processing of the instruction of the one or more input vector operands is deemed to be redundant. If the one or more input vector operands have greater than or equal to the threshold number of non-zero values, then the LSLU causes an instruction for processing the input vector operand(s) to be executed.

20 Claims, 14 Drawing Sheets

(56) References Cited

U.S. PATENT DOCUMENTS

| | | | |
|---|---|---|---|
| 2004/0117595 A1* | 6/2004 | Norris | G06F 9/3552 |
| | | | 711/214 |
| 2018/0046916 A1* | 2/2018 | Dally | G06N 3/063 |
| 2018/0232640 A1* | 8/2018 | Ji | G06N 3/082 |
| 2018/0300605 A1 | 10/2018 | Ambardekar et al. | |
| 2019/0205358 A1* | 7/2019 | Diril | G06N 3/063 |
| 2019/0205746 A1* | 7/2019 | Nurvitadhi | G06N 3/063 |

OTHER PUBLICATIONS

A. H. Zaabab, Qi-Jun Zhang and M. S. Nakhla, "Device and circuit-level modeling using neural networks with faster training based on network sparsity," in IEEE Transactions on Microwave Theory and Techniques, vol. 45, No. 10, pp. 1696-1704, (Year: 1997).*

Han et al., "EIE: Efficient Inference Engine on Compressed Deep Neural Network", ACM SIGARCH Computer Architecture News, May 3, 2016, 12 pages.

Parashar et al., "SCNN: An Accelerator for Compressed-sparse Convolutional Neural Networks", ACM SIGARCH Computer Architecture News, May 23, 2017, 12 pages.

Wen et al., "Learning Structured Sparsity in Deep Neural Networks", 30th Conference on Neural Information Processing Systems (NIPS 2016), Dec. 2016, 9 pages.

Yu et al., "Scalpel: Customizing DNN Pruning to the Underlying Hardware Parallelism", 2017 ACM/IEEE 44th Annual International Symposium on Computer Architecture (ISCA), Jun. 2017, pp. 548-560, vol. 1.

International Search Report and Written Opinion in International Application No. PCT/US2019/039264, dated Oct. 9, 2019, 14 pages.

Mao et al., "Exploring the Regularity of Sparse Structure in Convolutional Neural Networks", 31st Conference on Neural Information Processing Systems (NIPS 2017), Jun. 5, 2017, 10 pages, https://arxiv.org/pdf/1705.08922.pdf. [Retrieved May 7, 2019].

Narang et al., "Block-Sparse Recurrent Neural Networks", Nov. 8, 2017, 12 pages, https://arxiv.org/pdf/1711.02782.pdf.

Non-Final Office Action in Japanese Patent Application No. 2021-521289, dated May 10, 2022, 7 pages.

First Examination Report in Indian Patent Application No. 202117017754, dated Feb. 9, 2022, 8 pages.

* cited by examiner

1005

```
// Matrix multiplication between matrices A (M x K) and B (K x P)
// MatrixA and MatrixB are pointers to matrices A and B
// A is stored in row major format, B is stored in column major format
function matrixMul (float *MatrixA, float *MatrixB, int M, int K, int P) { float MatrixC[M][P];
    for (int i=0; i<M; i++)
        for (int j=0; j<P; j++)
            MatrixC[i][j] = innerProd (MatrixA + i*K, MatrixB + j*K, K);
    return MatrixC;
}
```

1010

```
// Matrix multiplication between matrices A (M x K) and B (K x P)
// MatrixA and MatrixB are pointers to matrices A and B
// N is the block size
// A is stored in row major format, B is stored in column major format
function matrixMul(float *MatrixA, float *MatrixB, int M, int K, int P){ float MatrixC[M][P];
    for (int i=0; i<M; i=i+N)
        for (int j=0; j<P; j=j+N)
            MatrixC[i:i+N][j:j+N] = outerProd(MatrixA + i*K, MatrixB + j*K, K, N);
    return MatrixC;
}
```

FIG. 10

```
function innerProd(float *vectorA, float *vectorB, int K) {
        float vA[numThreads], vB[numThreads]; // Vector registers storing A and B values
        float vC[numThreads]; // Vector registers storing partial C values per thread
        float Cij; // Final inner product value
        vC = initializeZeros(numThreads); // Initialize zeros in partial C values
        // Iterate across the common dimension K between matrices A and B
        for (ii = 0; ii < K; ii += numThreads){
                // Load non-zeros in vA and vB and return the corresponding loopIdx
                vA[threadID], vB[threadID], ii =v_lcsld(vectorA + ii, vectorB + ii, ii, K);
                // Calculate C values per thread
                parallel_for (threadID = 0; threadID < numThreads; threadID++) {
                        vC[threadID] += vA[threadID] * vB[threadID];
                }
        }
        // Add C element-wise across all threads to get the final Cij
        Cij = elementWiseSumAcrossThreads(vC);
        return Cij;
}
// Vector Lossy Combined Sparse Load instruction function implemented in LSLU
function v_lcsld(float *vectorA, float *vectorB, int idx, int maxIdx){
        float vA[numThreads], vB[numThreads]; // A and B Values across threads
        int NZCountA = 0, NZCountB = 0; // No. of non-zeros in A and B
        int NZthres = interThreadThres; // Set Thres for Non-zeros
        while (1){ // Keep loading A and B till termination condition is reached
                // Load A and B values from memory
                vA = loadFromMemory(vectorA);
                vB = loadFromMemory(vectorB);
                // Count no. of non-zeros in A and B across threads in this iteration
                for (i=0; i<numThreads; i++) {
                        if (vA[i] != 0) NZCountA++;
                        if (vB[i] != 0) NZCountB++;
                }
                if (((NZCountA < NZThres) or (NZCountB < NZThres)) and (idx < maxIdx)) {
                        // Termination condition not met
                        idx += numThreads; // Increment the loop index
                        vectorA += numThreads*sizeof(float); // Update A pointer
                        vectorB += numThreads*sizeof(float); // Update B pointer
                } else { // Termination condition met
                        break;
                }
        }
        return vA, vB, idx;
}
```

FIG. 11

```
function outerProd(float *MatrixA, float *MatrixB, int K, int N) {
    float vA[numThreads][N], vB[numThreads][N]; // N vector registers each for storing A & B
    float mC[numThreads][N][N]; // N x N Vector registers storing product matrix C
    // Accumulated non-zero value counts for each matrix operand (A and B) per thread
    int accNZCount[2][numThreads];
    mC = initializeZeros(numThreads, N, N); // Initialize zeros in C
    for (ii = 0; ii < K; ii += numThreads){ // Iterate across the common dimension K
        // Initialize all 0s in the accumulated non-zero count arrays
        accNZCount = initializeZeros(2, numThreads);
        // Load vectors A and B into VGPR using v_lssld instruction
        vA = v_lssld(MatrixA + ii*sizeof(float), 0, N);
        vB = v_lssld(MatrixB + ii*sizeof(float), 1, N);
        // Check if the block of MACs is redundant (can be skipped)
        if (s_z_check_branch(accNZCount) == 1) {
            continue; // No need to re-evaluate mC
        } else { // The block of MACs is irredundant and cannot be skipped
            parallel_for (threadID = 0; threadID < numThreads; threadID++) {
                // Calculate C values per thread
                for (i=0; i<N; i++)
                    for (j=0; j<N; j++)
                        mC[threadID][i][j] += vA[threadID][i]*vB[threadID][j]; }}}
    // Add mC element-wise across all threads to get the final C (N x N)
    mC_final = elementWiseSumAcrossThreads(mC);
    return mC_final;}
// Vector Lossy Single Sparse Load instruction function implemented in LSLU
function v_lssld(float *Matrix, int operandID, int N){
    float m[numThreads][N]; // Vector values per thread
    m = loadFromMemory(Matrix, N); // Load N contiguous values from memory for each thread
    parallel_for (i=0; i<numThreads; i++) // Update accumulated non-zero counts
        accNZCount[operandID][i] += numNonZeros(m[i][0:N]);
    return m; }
function s_z_check_branch(int accNZCount[][numThreads]){
    bool threadRedundant[numThreads], waveRedundant;
    // Check redundant conditions for each thread in a wavefront
    // No. of non-zeros in each thread should be less than intraThreadThres
    int NZThres = intraThreadThres;
    parallel_for (i=0; i<numThreads; i++)
        threadRedundant[i] = (accNZCount[0][i] < NZThres) or (accNZCount[1][i] < NZThres);
    // Check if each Thread is redundant
    waveRedundant = bitwiseAND(threadRedundant);
    return waveRedundant; }
```

FIG. 13

```
class skipQueue{ // SkipQueue entry fields
        int redundantIdx; // Index of redundant MAC
        skipQueue *next; // Next entry in queue };
skipQueue *head, *tail; // Head and tail of queue
function outerProd(float *MatrixA, float *MatrixB) {
        float vA[numThreads][N], vB[numThreads][N]; // N vector registers each for storing A & B
        float mC[numThreads][N][N]; // N x N Vector registers storing product matrix C
        mC = initializeZeros(numThreads, N, N); // Initialize zeros in C
        head = NULL; tail = NULL;        // Initialize heads and tails of the queue to NULL
        // Redundant MAC index calculation fields for A and B
        r_sizeA = N; r_baseA = 0; r_offset1A = 1; r_offset2A = N;
        r_sizeB = N; r_baseB = 0; r_offset1B = N; r_offset2B = 1;
        for (ii = 0; ii < K; ii += numThreads) { // Iterate across the common dimension K
                // Load vectors A and B into VGPR using v_lsls instruction
                vA = v_lsls(MatrixA + ii*sizeof(float), r_sizeA, r_offset1A, r_offset2A, r_baseA);
                vB = v_lsls(MatrixB + ii*sizeof(float), r_sizeB, r_offset1B, r_offset2B, r_baseB);
                for (i=0; i<N; i++) // Calculate NxN C values
                        for (j=0; j<N; j++)
                                // Check if current MAC index is at the head of queue
                                if (checkSkipQueue(i*N + j) == 1) {
                                        continue;
                                } else { // Update mC in each thread
                                        parallel_for (threadID = 0; threadID < numThreads; threadID++)
                                                mC[threadID][i][j] += vA[threadID][i]*vB[threadID][j]; }}
        // Add mC element-wise across all threads to get the final C (N x N)
        mC_final = elementWiseSumAcrossThreads(mC);
        return mC_final; }
// Vector Lossy Sparse Load and Skip instruction function implemented in LSLU
function v_lsls(float *Matrix, int r_size, int r_offset1, int r_offset2, int r_base){
        float m[numThreads][r_size]; // Vector values per thread
        bool NZCount[r_size]; // No. of non-zeros across threads for each value
        m = loadFromMemory(Matrix, r_size); // Load values from memory for each thread
        NZCount = initializeZeros(r_size); // Initialize all 0s in the NZCount vector
        // Check if each thread loaded a vector of 0 values
        parallel_for (i=0; i<r_size; i++) {
                NZCount[i] = numNonZeros(m[:][i]);
                if (NZCount[i] < interThreadThres) {// v[i] almost 0 across all the threads
                        for (j=0; j<r_size; j++) {// Generate all redundant MACs operating on v[i]
                                rIdx = base + offset1*j + offset2*i; // redundant MAC index
                                writeToSkipQueue(rIdx, tail); // Add redundant index to SkipQueue }}}
        return m; }
function checkSkipQueue(int MACidx, skipQueue *head){
        if ((head != NULL) and (head->redundantIdx == MACidx)){ // Check index at head of Queue
                removeFromSkipQueue(MACidx, head);
                return 1; // Present in skipQueue
        } else
                return 0; // Absent from skipQueue }
```

FIG. 14

FAMILY OF LOSSY SPARSE LOAD SIMD INSTRUCTIONS

BACKGROUND

Description of the Related Art

An emerging technology field is machine learning, with a neural network being one type of a machine learning model. Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others.

Deep neural networks (DNNs) are known to exhibit sparsity, or zero values, in their different data structures. For example, the activations in ResNet-50 and AlexNet exhibit average sparsities of 58% and 55%, respectively, while the weights in DeepCompression AlexNet exhibit 65% sparsity during the inference phase. Zero values in DNN data structures cause the resultant multiply-add (MAD) operations, which may be part of multiply-accumulate (MAC) operations, to be unnecessary and inefficient. This results in inefficient implementations of DNNs on typical hardware platforms.

BRIEF DESCRIPTION OF THE DRAWINGS

The advantages of the methods and mechanisms described herein may be better understood by referring to the following description in conjunction with the accompanying drawings, in which:

FIG. 10 illustrates examples of pseudocode for implementing inner product and outer product matrix multiplication operations in accordance with one implementation.

FIG. 11 illustrates an example of pseudocode for implementing a vector lossy combined sparse load instruction in accordance with one implementation.

FIG. 13 illustrates an example of pseudocode for implementing a vector lossy single sparse load instruction in accordance with one implementation.

FIG. 14 illustrates an example of pseudocode for implementing a vector lossy sparse load and skip instruction in accordance with one implementation.

DETAILED DESCRIPTION OF IMPLEMENTATIONS

Figure 1:
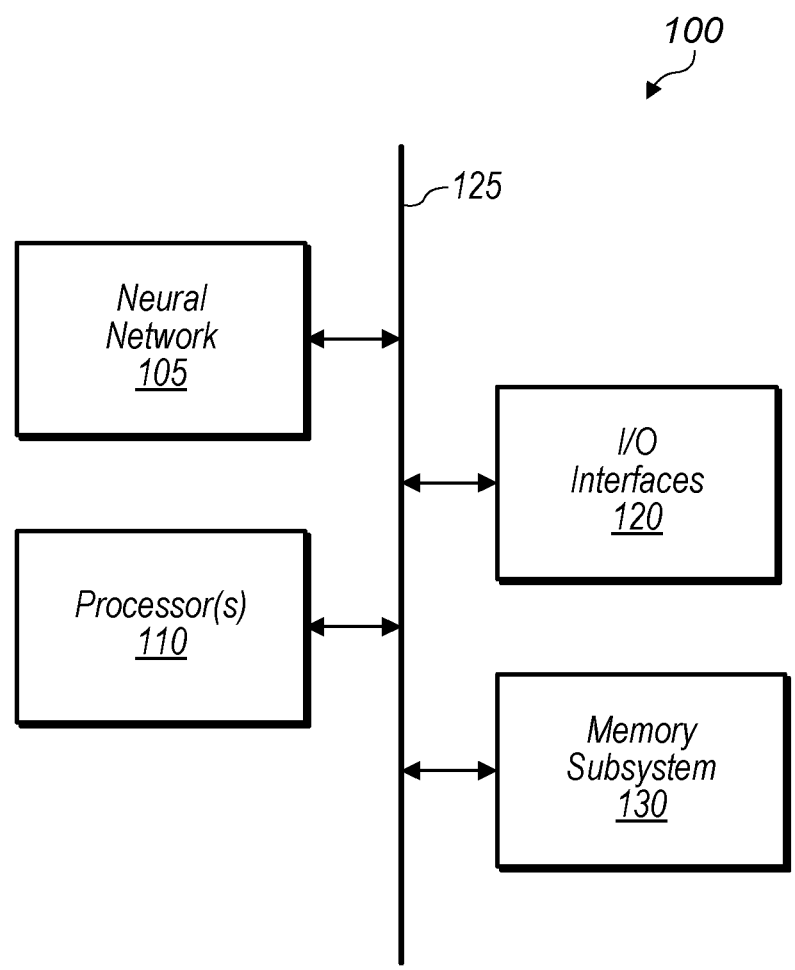
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a family of lossy sparse load single instruction, multiple data (SIMD) instructions are disclosed herein. Deep neural network (DNN) data structures typically include some amount of sparsity (i.e., zero values). In various implementations, a family of SIMD lossy sparse load instructions and associated microarchitectural extensions are utilized by the system. This family of instructions optimizes processor performance and power for dynamic sparsity that is encountered during DNN training and inference. In one implementation, redundant multiply-accumulate (MAC) or multiply-add (MAD) operations are identified and eliminated by subjecting input vector operands to a user-defined mask. The user-defined mask optionally imposes additional sparsity on an input data structure to boost performance and power gains by exploiting the resiliency of a particular DNN. In various implementations, instructions are skipped on a wavefront (i.e., warp) basis by the SIMD scheduler as a block or selectively via a skip queue.

A system includes at least a processor with a plurality of compute units coupled to one or more memories. In one implementation, each compute unit includes a lossy sparse load unit and a plurality of processing elements. In one implementation, the processing elements are SIMD units. In one implementation, the lossy sparse load unit determines how many non-zero values are present in one or more input vector operands of a pending instruction. In one implementation, the lossy sparse load unit causes the one or more input vector operands to be processed by the plurality of processing elements responsive to determining that the number of non-zero values in the one or more input vector operands is greater than or equal to a threshold. Otherwise, if the number of non-zero values in the one or more input vector operands is less than the threshold, then the lossy sparse load unit causes processing of the one or more input vector operands by the plurality of processing elements to be skipped. In one implementation, the threshold is programmable.

In one implementation, the system receives program code of a neural network for execution by the system's processing elements, with the program code including one or more first instructions and one or more second instructions. The system executes the first instructions on the processing elements and skips execution of the second instructions on the number of non-zero values in input vector operands of the first and second instructions. The system implements a neural network by executing the first instructions and skipping the second instructions. In one implementation, the system implements the neural network to generate a classification of a first dataset. It is noted that in the above characterization, the first instructions and second instructions are not identifiable beforehand. Rather, the first instructions are identified at runtime based on their operands having less than a threshold amount of sparsity while the second instructions are identified at runtime based on their operands having greater than or equal to a threshold amount of sparsity. In various implementations, the threshold amount of sparsity is user-configurable based on a tolerance for error in the implementation of the neural network.

Referring now to FIG. 1, a block diagram of one implementation of a computing system 100 is shown. In one implementation, computing system 100 includes at least neural network 105, processor(s) 110, input/output (I/O) interfaces 120, bus 125, and memory subsystem 130. In other implementations, computing system 100 can include other components and/or computing system 100 can be arranged differently. In various implementations, neural network 105 includes logic for implementing any of various machine learning algorithms or machine learning models. In one implementation, neural network 105 implements one or more layers of a convolutional neural network. For example, in this implementation, neural network 105 implements one or more convolutional layers and/or one or more fully connected layers. In another implementation, neural network 105 implements one or more layers of a recurrent neural network. In various implementations, neural network 105 is trained using a backward propagation algorithm via stochastic gradient-descent (SGD). In one implementation, the logic of neural network 105 includes a plurality of multiplier-accumulate (MAC) units, peripherals, and internal memory storage. Depending on the implementation, any of various software deep learning frameworks (e.g., Caffe, TensorFlow, Torch) are used for training neural network 105 on a particular processing unit (e.g., graphics processing unit (GPU)).

Neural network 105 is utilized in a variety of different applications which vary according to the implementation. For example, in one implementation, neural network 105 analyzes a video frame to generate one or more label probabilities for the video frame. For example, potential use cases include at least eye tracking, object recognition, point cloud estimation, ray tracing, light field modeling, depth tracking, and others. For eye tracking use cases, probabilities generated by neural network 105 are based on learned patterns, dwell, transition angles, blink, etc. In other implementations, neural network 105 is trained and customized for other types of use cases.

Generally speaking, neural network implementations exhibit two broad types of sparsity. The first sparsity is static sparsity in weights caused by pruning networks. The second sparsity is dynamic sparsity in activations, as well as, errors in training. The sparsity in activations is caused by the presence of activation functions such as Rectified Linear Unit (ReLU), a function which zeroes out negative inputs. In contrast, the sparsity in errors stems from the presence of both activation functions and Max Pooling layers as zeros can be propagated back for negative inputs of activation functions like ReLU and non-maximum inputs of Max Pooling layers. To exploit the static and dynamic sparsity present in data structures being processed by neural network 105, a family of instructions and associated microarchitectural extensions are introduced in this disclosure. The family of instructions and associated microarchitectural extensions enable performance to be improved and power consumption to be reduced for neural network 105.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with neural network 105 is performed by processor(s) 110. Additionally, neural network 105 is implemented using any of these types of processing units and/or other types of processing elements. Memory subsystem 130 are representative of any number and type of memory devices. For example, the type of memory in memory subsystem 130 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. Memory subsystem 130 is accessible by neural network 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
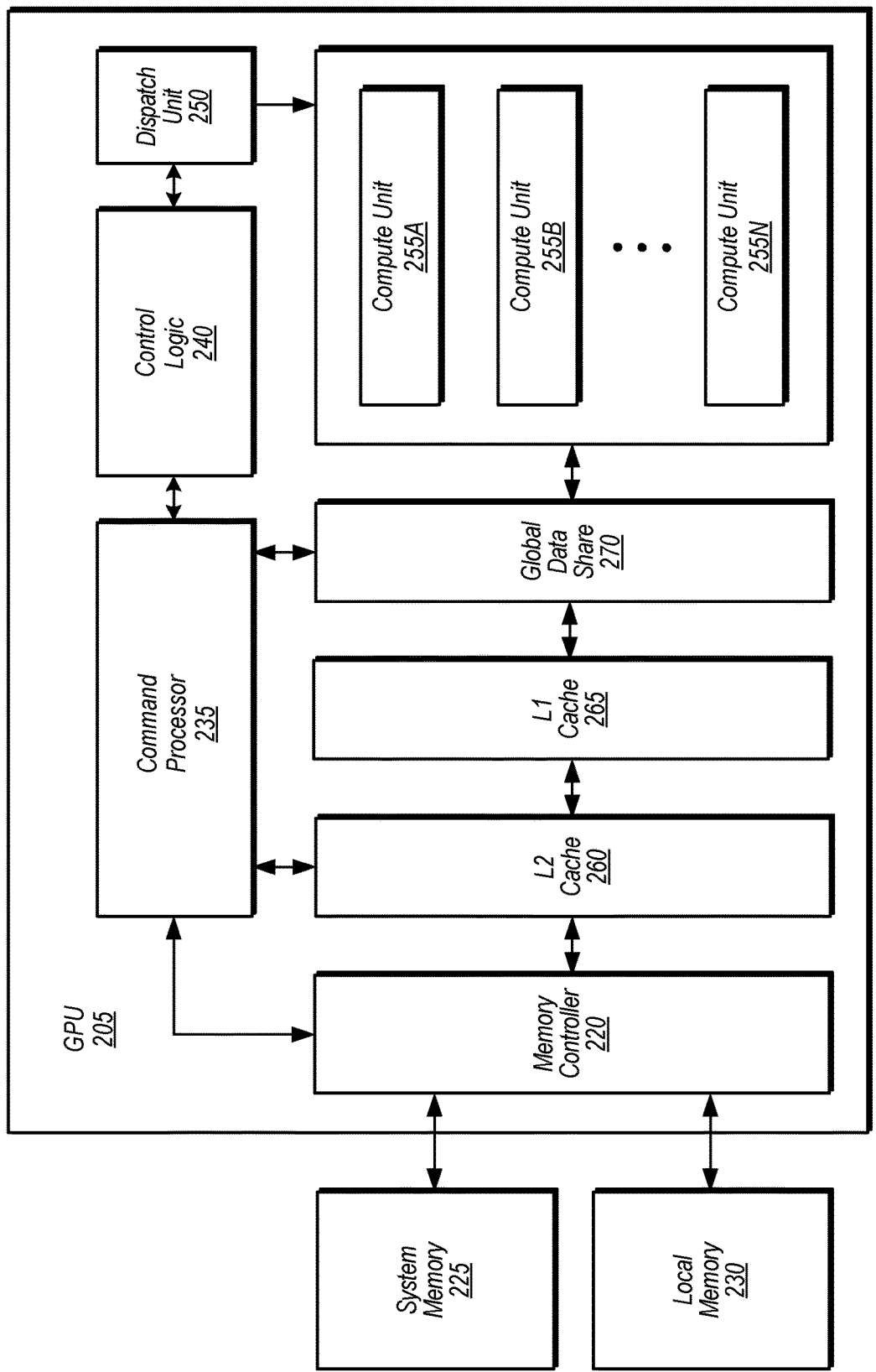
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. In one implementation, neural network 105 (of FIG. 1) executes on GPU 205. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners.

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to dispatch kernels to compute units 255A-N. Control logic 240 monitors the various resources of GPU 205 and helps dispatch unit 250 determine how to dispatch wavefronts to compute units 255A-N. Threads within kernels executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
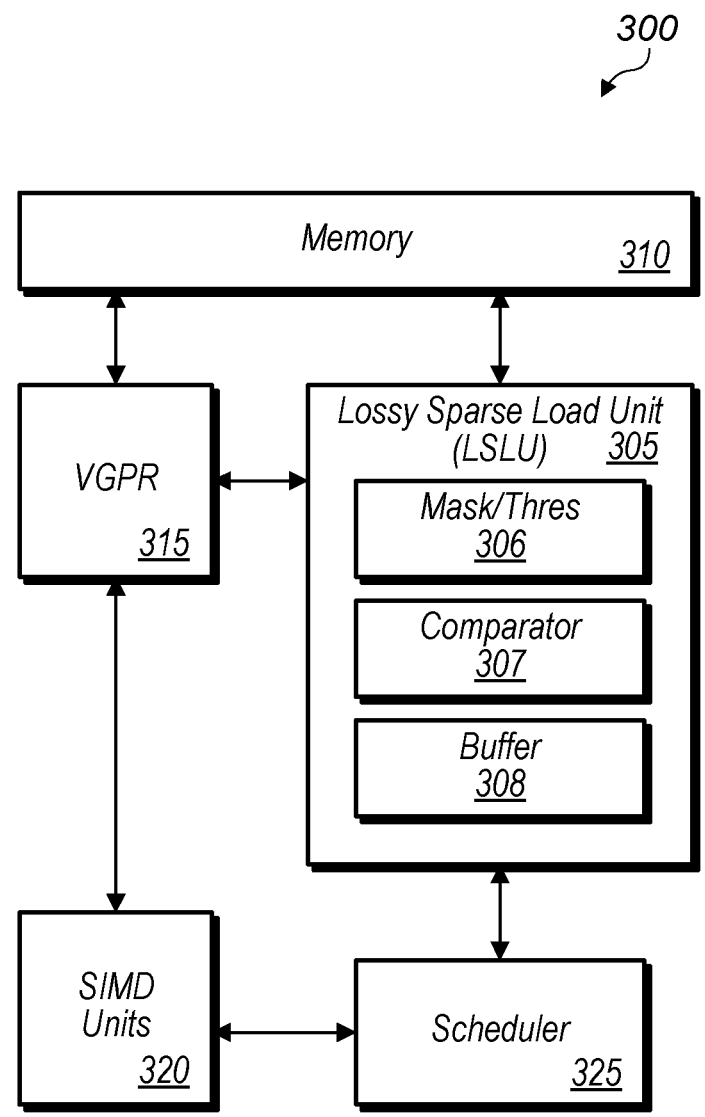
FIG. 3 is a block diagram of one implementation of compute unit logic.

Referring now to FIG. 3, a block diagram of one implementation of compute unit logic 300 is shown. In one implementation, compute unit logic 300 is included in each of compute units 255A-N (of FIG. 2). In one implementation, logic 300 includes lossy sparse load unit (LSLU) 305, memory 310, vector general purpose register (VGPR) 315, single instruction, multiple data (SIMD) units 320, and scheduler 325. It is noted that LSLU 305 can also be referred to herein as a "load unit". It is further noted that SIMD units 320 can also be referred to herein as "processing elements". In one implementation, logic 300 is included within a graphics processing unit (GPU). In another implementation, logic 300 is included within a field programmable gate array (FPGA). In a further implementation, logic 300 is included within an application specific integrated circuit (ASIC). In other implementations, logic 300 is included within other types of processing units, computing devices, and/or computing systems. It is noted that logic 300 can also be referred to herein as "control logic".

In one implementation, LSLU 305 loads operands from memory 310 to VGPR 315 and then determines how many non-zero values are in the input vector operands. In another implementation, LSLU 305 determines how many non-zero values are in input vector operands before loading the input vector operands from memory 310 to VGPR 315. It is noted that in one implementation, the term "non-zero value" is defined as a value which is not equal to zero. In another implementation, the term "non-zero value" is defined as a value that is greater than a threshold value or with an absolute value greater than a threshold value. For example, in one implementation, the threshold value is a small positive value (e.g., 0.1) which is programmable. In some implementations, LSLU 305 will not load a given vector operand from memory 310 to VGPR 315 if the number of non-zero values in the given input vector operand is less than a threshold number. This threshold number is shown as mask/thres 306 in LSLU 305. The comparison logic used to compare the number of non-zero values to the threshold number is shown as comparator 307 in LSLU 305. In other implementations, LSLU 305 will load a given input vector operand from memory 310 to VGPR 315 or buffer 308 even if the number of non-zero values in the given input vector operand is less than the threshold number, but then LSLU 305 will discard, invalidate, and/or overwrite the given input vector operand in VGPR 315 if the number of non-zero values in the given input vector operand is less than the threshold number.

Also shown in logic 300 is scheduler 325 which issues instructions for execution on SIMD units 320. In one implementation, SIMD units 320 perform a matrix multiplication on the input vector operands of instructions issued for execution by scheduler 325. The matrix multiplication can be an inner product or outer product matrix multiplication, depending on the type of instruction being executed. In other implementations, SIMD units 320 perform other types of operations on the input vector operands of instructions issued for execution by scheduler 325. In one implementation, if LSLU 305 determines that the input vector operand(s) for a given instruction have less than a threshold number of non-zero values, then scheduler 325 does not schedule the given instruction on SIMD units 320. Rather, schedule 325 will move on to the next instruction. By skipping instructions with less than the threshold number of non-zero values, the efficiency of neural network implementations on SIMD units 320 is improved.

Figure 4:
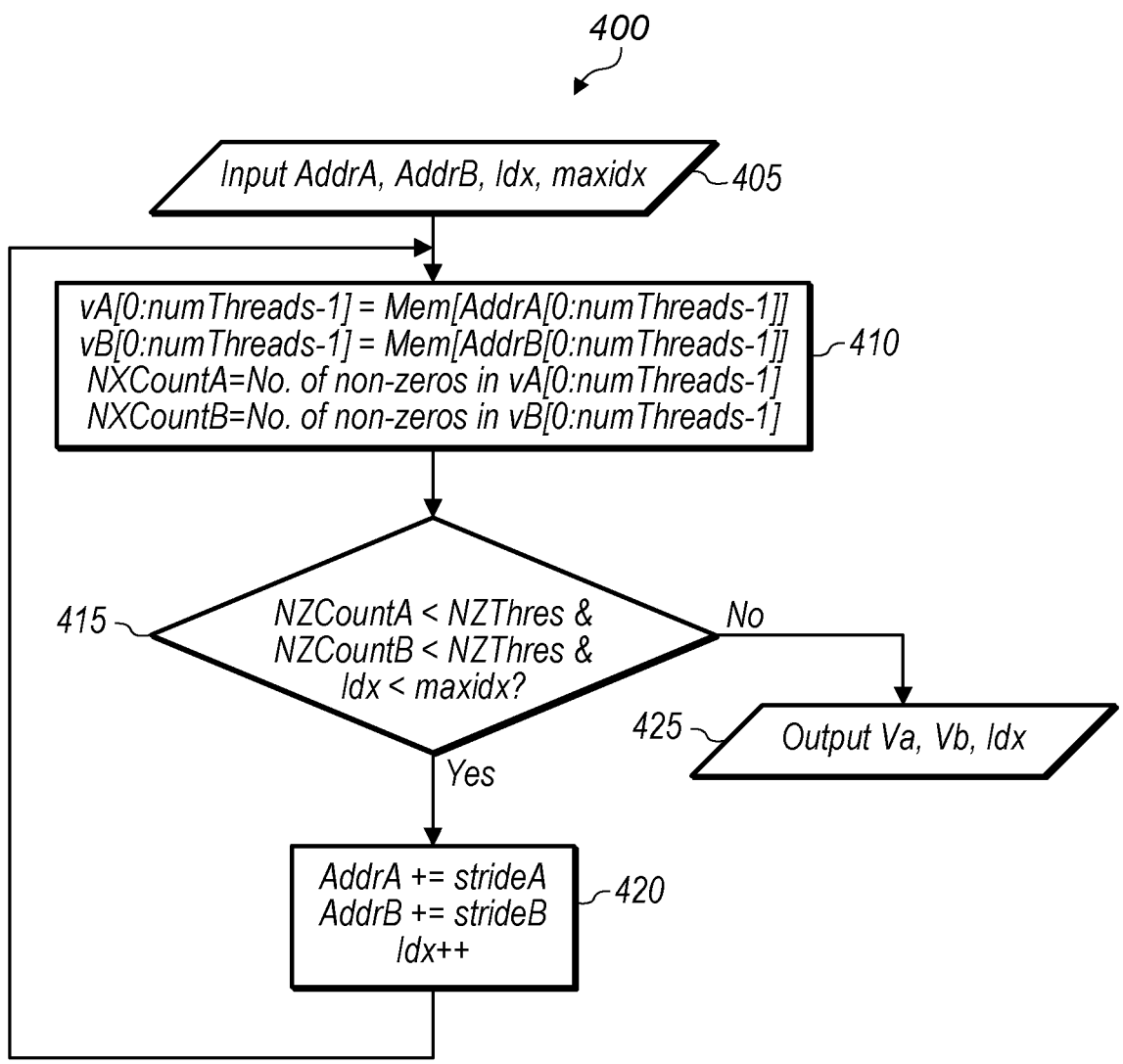
FIG. 4 is a generalized flow diagram illustrating one implementation of a method for executing a vector lossy combined sparse load instruction.

Turning now to FIG. 4, one implementation of a method 400 for executing a vector lossy combined sparse load instruction is shown. For purposes of discussion, the steps in this implementation and those of FIG. 5-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A lossy sparse load unit (LSLU) loads both A and B input vector operands as well as a current index into a dataset and a maximum index for the dataset (block 405). Next, the LSLU determines the number of non-zero values in each of the A and B input vector operands (block 410). Then, if the number of non-zero values in each input vector operand is less than a threshold and the current index into the dataset is less than the maximum index (conditional block 415, "yes" leg), then the LSLU increments the pointer to the addresses of the input vector operands by a stride and the LSLU increments the current dataset index (block 420). After block 420, method 400 returns to block 410. If the number of non-zero values in either input vector operand is greater than or equal to the threshold or if the current index into the dataset is equal to the maximum index (conditional block 415, "no" leg), then the LSLU returns values to the input vector operand A and B values in the vector register file (block 425). After block 425, method 400 ends. In one implementation, the vector lossy combined sparse load instruction is targeted toward the simplest inner product and outer product implementations with block size of one that iteratively load one operand each for A and B before performing a multiply-accumulate (MAC) operation on the operands.

Figure 5:
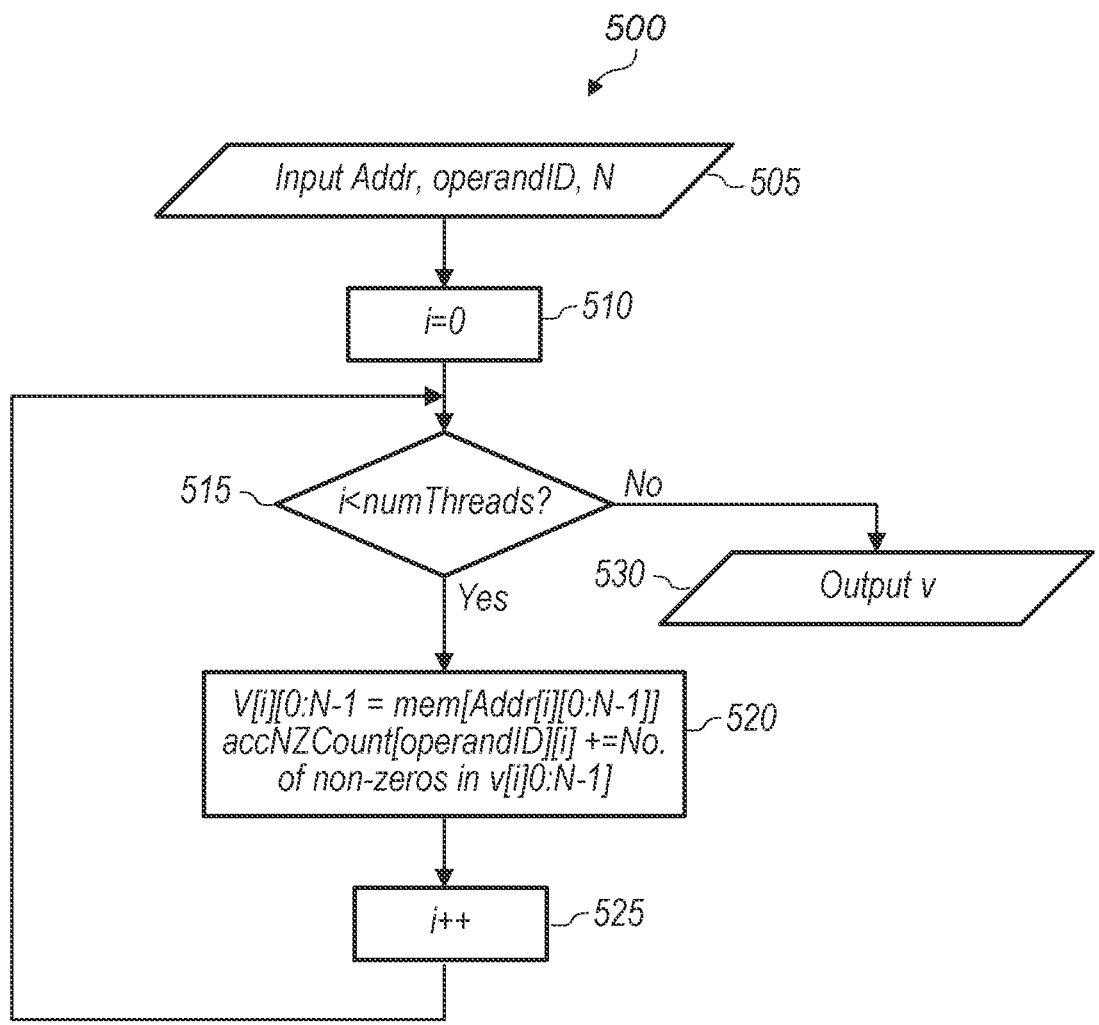
FIG. 5 is a generalized flow diagram illustrating one implementation of a method for executing a vector lossy single sparse load instruction.

Referring now to FIG. 5, one implementation of a method 500 for executing a vector lossy single sparse load instruction is shown. A LSLU receives a load instruction for an input vector operand for a specified address, an operand identifier (ID), and an N value, with the N value specifying a total number of input vector operands (block 505). Next, the LSLU sets an "i" variable equal to 0 (block 510), and then the LSLU checks if the "i" variable is less than the total number of threads of a wavefront (conditional block 515). If the "i" variable is less than the total number of threads (conditional block 515, "yes" leg), then the LSLU loads the input vector operand from memory into the vector register file and the LSLU counts the number of non-zero values in the input vector operand and stores the number in an "accNZCount" array (block 520). Next, the LSLU increments the "i" variable (block 525), and then method 500 returns to conditional block 515. If the "i" variable is equal to the number of threads (conditional block 515, "no" leg), then the LSLU returns the value of vector "v" (block 530). After block 530, method 500 ends. One implementation for processing the "accNZCount" array is described below in the discussion associated with FIG. 6.

Figure 6:
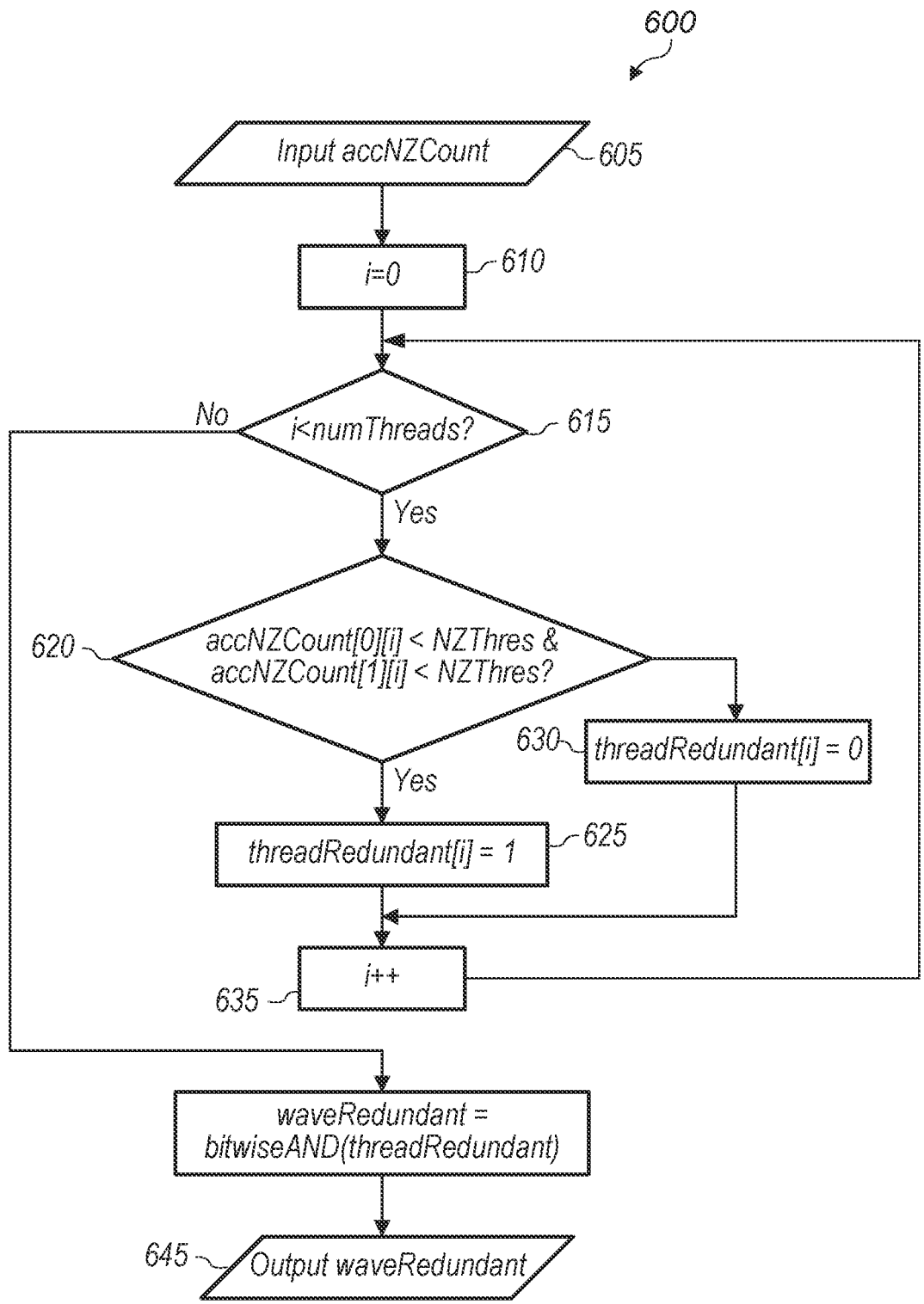
FIG. 6 is a generalized flow diagram illustrating one implementation of a method for processing an accumulated non-zero count array.

Turning now to FIG. 6, one implementation of a method 600 for processing an accumulated non-zero count (i.e., accNZCount) array is shown. In one implementation, method 600 is executed after the execution of the vector lossy single sparse load instruction described in method 500.

The LSLU receives the accNZCount array (block 605). Next, an "i" variable is initialized to zero (block 610). Then, the LSLU determines if the "i" variable is less than the total number of threads of a wavefront (conditional block 615).

If the "i" variable is less than the total number of threads of the wavefront (conditional block 615, "yes" leg), then the LSLU determines if the number of non-zero values in each of the two input operands is less than a threshold (i.e., NZThres) (conditional block 620). If the non-zero count for each of the two input operands is less than the threshold (conditional block 620, "yes" leg), then a thread redundant indicator is set to 1 for a current index "i" (block 625). Otherwise, if the non-zero count for either of the two input operands is greater than or equal to the threshold (conditional block 620, "no" leg), then the thread redundant indicator is set to 0 for the current index "i" (block 630). After blocks 625 and 630, the current index "i" is incremented (block 635), and then method 600 returns to conditional block 615.

If the "i" variable is equal to the total number of threads (conditional block 615, "no" leg), then the LSLU determines whether the entire wavefront is redundant by performing a bitwise AND operation on a plurality of the thread redundant indicators (block 640). Then the LSLU returns the redundant wavefront value indicating if the entire wavefront is redundant (block 645). After block 645, method 600 ends.

Figure 7:
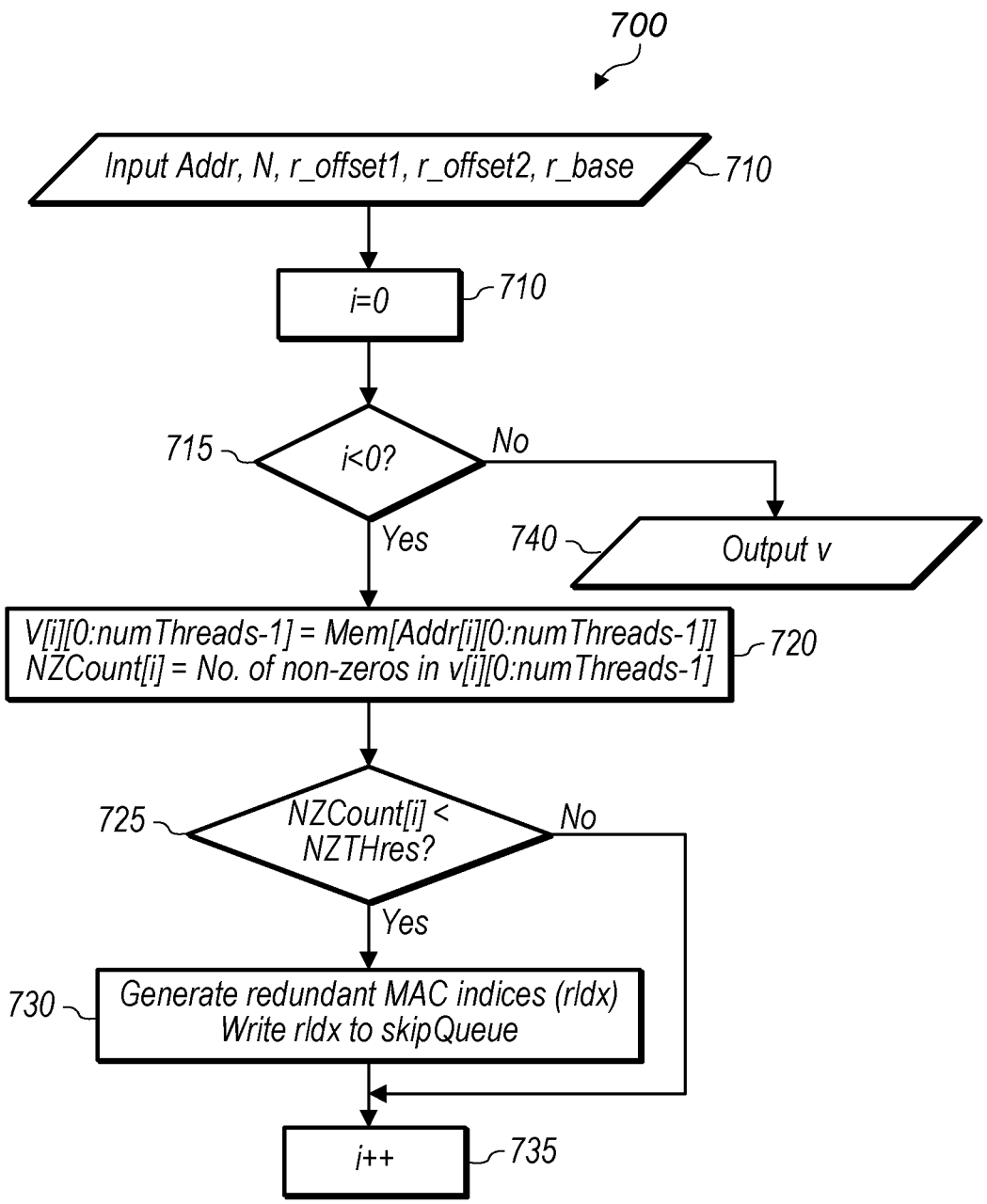
FIG. 7 is a generalized flow diagram illustrating one implementation of a method for executing a vector lossy sparse load and skip instruction.

Referring now to FIG. 7, one implementation of a method 700 for executing a vector lossy sparse load and skip instruction is shown. The LSLU detects a vector lossy sparse load and skip instruction in the program code and retrieves the different encoded fields of the instruction (block 705). In one implementation, the encoded fields include the address, N (the total number of input vector operands), r_offset1, r_offset2, and r_base, which are used to calculate the redundant indices for a given zero value. In other implementations, the vector lossy sparse load and skip instruction includes other numbers and/or types of encoded fields.

Next, the LSLU sets an "i" variable equal to zero (block 710). Then, the LSLU determines if the "i" variable is less than the value of "N" (conditional block 715). If the "i" variable is less than the value of "N" (conditional block 715, "yes" leg), then the LSLU loads the next group of values from the dataset from memory into the vector register file and then generates a count of the number of non-zero values in the loaded group of values (block 720). This number of non-zero values is represented by "NZCount[i]" in FIG. 7.

If the number of non-zero values is less than a threshold (i.e., NZThres) (conditional block 725, "yes" leg), then the LSLU generate redundant multiply-accumulate (MAC) indices (i.e., ridx) and writes the redundant MAC indices to a skip queue (block 730). After block 730, the LSLU increments the "i" variable (block 735) and then method 700 returns to conditional block 715. If the number of non-zero values is greater than or equal to the threshold (conditional block 725, "no" leg), then the LSLU increments the "i" variable (block 735) and then method 700 returns to conditional block 715. If the "i" variable is equal to the value of "N" (conditional block 715, "no" leg), then the LSLU returns the group of values "v" (block 740). After block 740, method 700 ends. It is noted that the scheduler queries the skip queue before issuing an instruction for execution to the SIMD units, and if an index for the instruction is stored in the skip queue, then the scheduler moves on to the next instruction.

Figure 8:
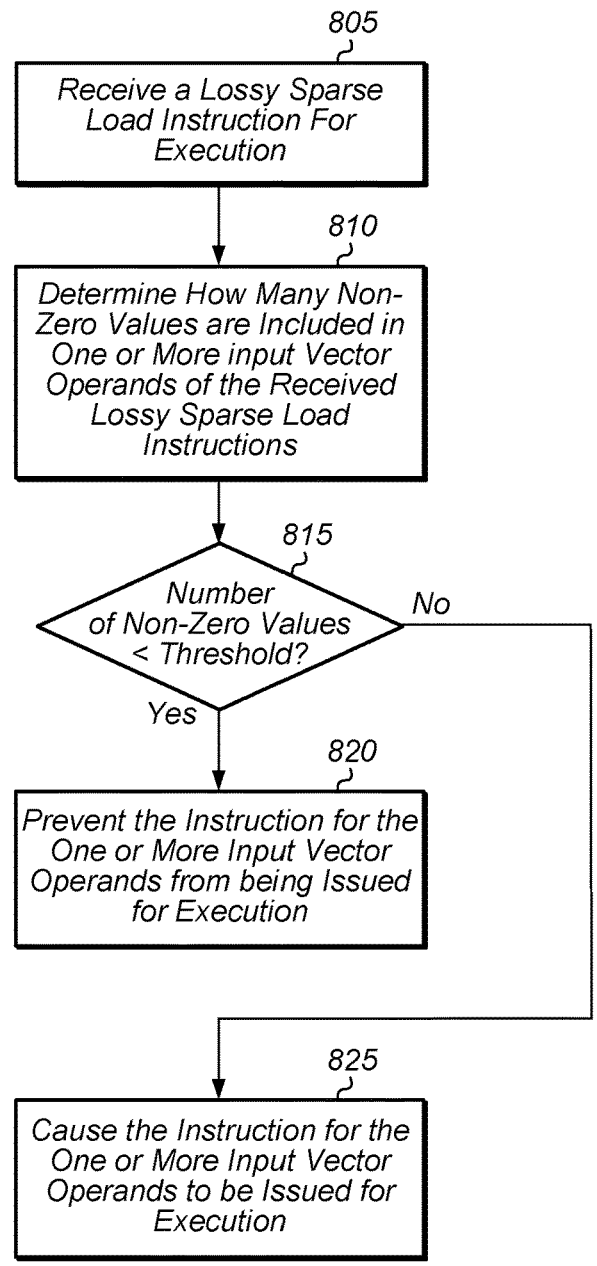
FIG. 8 is a generalized flow diagram illustrating one implementation of a method for executing a lossy sparse load instruction.

Turning now to FIG. 8, one implementation of a method 800 for executing a lossy sparse load instruction is shown. A lossy sparse load unit receives a lossy sparse load instruction for execution (block 805). The lossy sparse load unit determines how many non-zero values are included in one or more input vector operands of the received lossy sparse load instruction (block 810). If the number of non-zero values is less than a threshold (conditional block 815, "yes" leg), then the lossy sparse load unit prevents the instruction for the one or more input vector operands from being issued for execution (block 820). In other words, the lossy sparse load unit causes processing of the one or more input vector operands to be skipped in block 820. In one implementation, the threshold is user-configurable. In one implementation, a user sets the threshold based on a tolerance for error in the underlying neural network. If the number of non-zero values is greater than or equal to the threshold (conditional block 815, "no" leg), then the lossy sparse load unit causes the instruction for the one or more input vector operands to be issued for execution (block 825). After blocks 820 and 825, method 800 ends. It is noted that method 800 is repeated for each lossy sparse load instruction received by the lossy sparse load unit.

Figure 9:
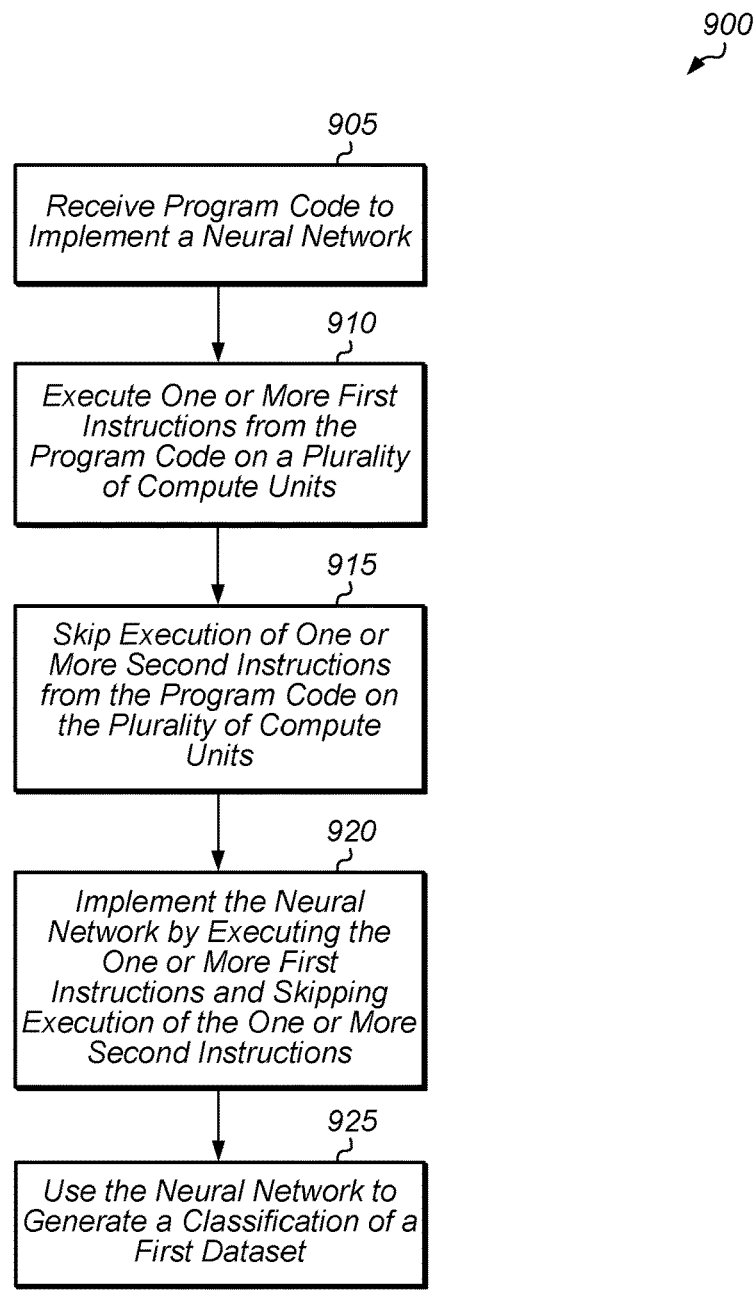
FIG. 9 is a generalized flow diagram illustrating one implementation of a method for implementing a neural network.

Referring now to FIG. 9, one implementation of a method 900 for implementing a neural network is shown. A computing system receives program code to implement a neural network (block 905). The program code includes a plurality of instructions for implementing the neural network. In one implementation, the computing system includes a plurality of compute units, with each compute unit including a lossy sparse load unit.

The system executes one or more first instructions from the program code on a plurality of compute units (block 910). Also, the system skips execution of one or more second instructions from the program code on the plurality of compute units (block 915). The system implements the neural network by executing the one or more first instructions and skipping execution of the one or more second instructions (block 920).

Then, the system uses the neural network to generate a classification of a first dataset (block 925). After block 925, method 900 ends. In one implementation, the first dataset is an image, and the classification identifies a given category to which the image belongs. In another implementation, the first dataset is a video, and the classification assigns the video to a given category. In other implementations, the first dataset includes other types of data. It is noted that method 900 can be implemented multiple times to generate classifications of any number of datasets.

Turning now to FIG. 10, examples of pseudocode for implementing inner product and outer product matrix multiplication operations are shown. There are a wide variety of general matrix multiplication (GEMM) routines for realizing dense matrix multiplications on GPUs and other types of processing units. The optimal routine in a given scenario is determined by the size of operand matrices, size of local and global memories as well as the available accelerator features for computation and compression. GEMM algorithms can broadly be differentiated based on whether they utilize inner-products or outer-products. Pseudocode 1005 is shown at the top of FIG. 10 as one example for implementing an inner product matrix multiplication operation. The matrixMul function performs a dense matrix multiplication between a M×K matrix A and a K×P matrix B to yield a M×P matrix C. It is assumed for the purposes of pseudocode 1005 that matrix A is stored in a row major format and matrix B is stored in a column major format. The matrixMul function repeatedly calls the innerProd function to calculate each element C[i][j] by performing an inner product between the $i^{th}$ row of A and the $j^{th}$ column of B. In an DNN implementation, matrix A corresponds to output activations of a previous layer, matrix B corresponds to weights of the current layer, and matrix C corresponds to output activations of the current layer.

Pseudocode 1010 is shown at the bottom of FIG. 10 as one example for implementing an outer product matrix multiplication operation. The matrixMul function repeatedly calls the outerProd function to calculate a block of N×N values in matrix C. The outerProd function derives its name from the fact that it sums up the outer products between the N sized columns in A[i:i+N][:] and N sized rows in B[:][j:j+N]. Sparsity in matrices A and B causes the multiply-accumulate (MAC) operations performed in the innerProd and outerProd functions to become redundant. Both these functions are typically parallelized in GPUs per SIMD unit. Simply masking off individual threads with redundant MACs in a SIMD unit would give power and energy savings, but execution time savings require an entire redundant wavefront to be skipped. Accordingly, in one implementation, an entire wavefront is eliminated if all the threads of the wavefront load zero operand values from either A or B. In another implementation, the resiliency of DNN applications is exploited to increase the chances of encountering redundant wavefronts by identifying a wavefront to be redundant if most, but not all, values loaded by the threads are zeros. In one implementation, the number of values that need to be zero for the wavefront to be characterized as redundant is user-configurable. In this implementation, the final application dictates the number of non-zeros (i.e., amount of lossiness) that can be sustained with acceptable degradation in the result.

Referring now to FIG. 11, an example of pseudocode 1105 for implementing a vector lossy combined sparse load instruction is shown. Pseudocode 1105 is shown as one example for implementing an inner product matrix multiplication using a vector lossy combined sparse load (or V_LCSLD) instruction. In other implementations, pseudocode 1105 can include other types and/or arrangements of instructions. In one implementation, the V_LCSLD instruction is primarily targeted toward the simplest inner product and outer product implementations with block size of 1 that iteratively load one operand each for matrices A and B before performing a MAC operation on the operands. The V_LCSLD instruction operates by reading both operands from memory in a combined form and returning values to the vector register file (VGPR) only when the number of non-zeros in each of the operands exceeds the provided lossy threshold (thres). The V_LCSLD instruction automatically proceeds to the operand loads for the next MAC if the current loads return zero values in most of the threads.

In one implementation, the innerProd function repeatedly calls the V_LCSLD function to load the vA and vB values before performing a MAC operation on the vA and vB values. The V_LCSLD function loads the operands A and B for all threads in a wavefront into vectors vA and vB respectively. Next, the V_LCSLD function counts the number of non-zero values in vA and vB. If the termination condition for the loop is not met (i.e., the number of non-zeros is within NZThres and the current loop index is less than the maxIdx), the V_LCSLD function loads the next operand values and increments the index (i.e., idx). On termination, the current values of vA and vB are returned along with the current idx value to ensure correct execution of the final innerProd function.

Figure 12:
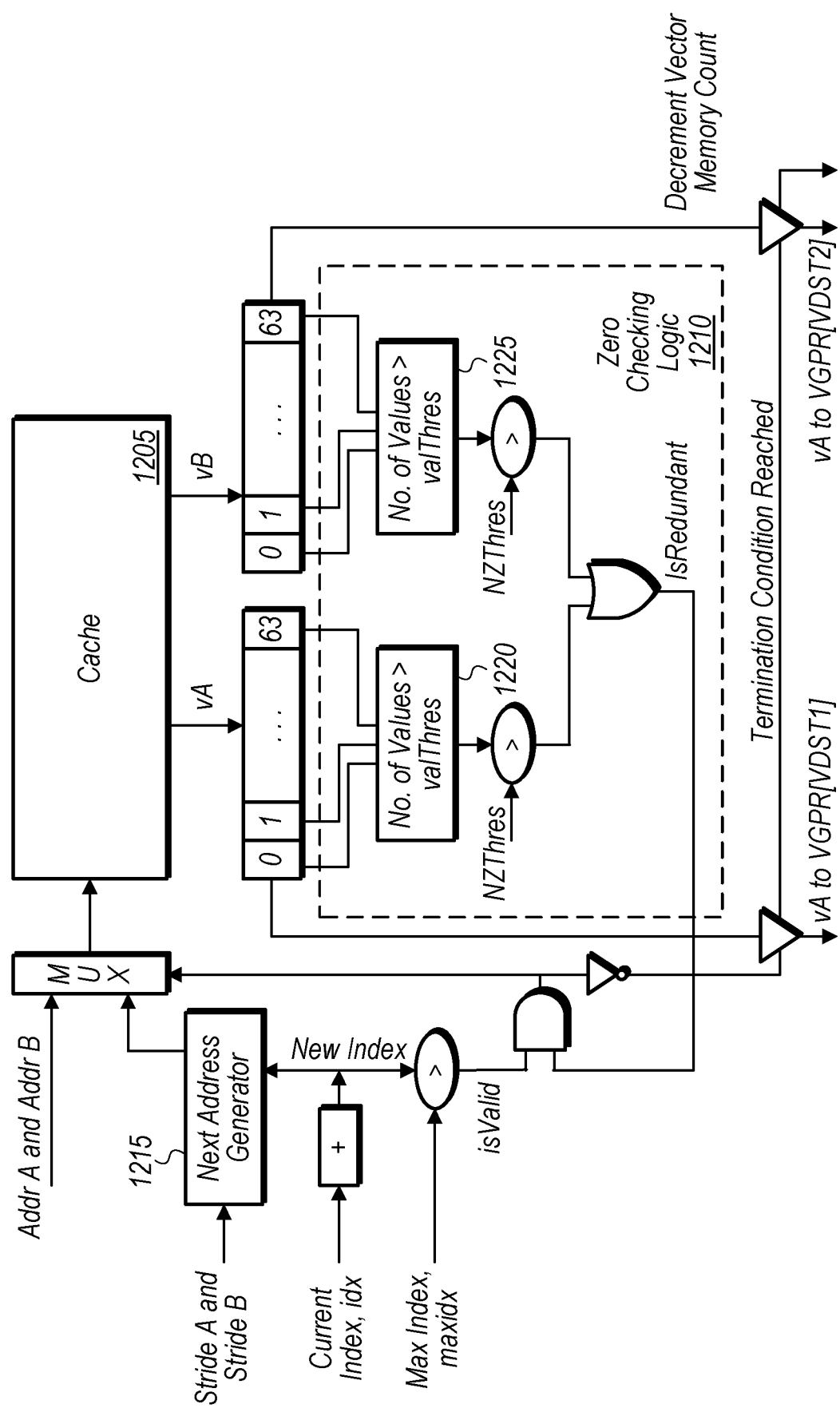
FIG. 12 is a block diagram of one implementation of logic for implementing a vector lossy combined sparse load instruction.

Turning now to FIG. 12, a block diagram of one implementation of logic 1200 for implementing a vector lossy combined sparse load instruction. In one implementation, logic 1200 includes at least cache 1205, zero checking logic 1210, next address generator 1215, and non-zero value counting logic 1220 and 1225 for input vector operands A and B, respectively. The number of non-zero values in the vector A and B operands are counted by logic 1220 and 1225, respectively. The number of non-zero values is compared to a threshold for the A and B operands, and the outputs of the comparisons are fed to an OR-gate. The output of the OR-gate is an "IsRedundant" signal which indicates if the input vector operands are redundant. In other implementations, logic 1200 can include other components and/or be organized in other suitable manners.

Referring now to FIG. 13, an example of pseudocode 1305 for implementing a vector lossy single sparse load instruction is shown. Pseudocode 1305 is shown as one example for implementing an outer product matrix multiplication using a vector lossy single sparse load (or V_LSSLD) instruction. In other implementations, pseudocode 1305 can include other types and/or arrangements of instructions. The V_LSSLD instruction targets outer product implementations with a block size N>1. The V_LSSLD instruction successfully skips a block of redundant MACs following a block of multiple operand loads. The V_LSSLD instruction counts the number of zeros among the values loaded into the VGPR and accumulates the count across the entire block of loads for an operand. A S_Z_CHECK_BRANCH instruction at the end of the loads compares the accumulated value with the provided lossy threshold. The comparison determines if the execution flows into the MACs or moves on to the next block of loads if the current block of MACs is redundant. The array accNZCount accumulates the number of non-zeros encountered for each of the operands loaded by different threads in the block of loads.

Turning now to FIG. 14, an example of pseudocode 1405 for implementing a vector lossy sparse load and skip instruction is shown. Pseudocode 1405 is shown as one example for implementing an outer product matrix multiplication using a vector lossy sparse load and skip (or V_LSLS) instruction. In other implementations, pseudocode 1405 can include other types and/or arrangements of instructions. The V_LSLS instruction is targeted toward blocked outer product implementations operating on matrices with scattered sparsity. The V_LSLS instruction allows the GPU to skip individual redundant MACs (at the wavefront level) in a block of MACs following a block of operand loads. The V_LSLS instruction writes to a skipQueue that has a list of redundant MAC indices. The head of the skipQueue is read by the scheduler before fetching or dispatching an instruction to check if the current instruction is redundant. If the current instruction is redundant, the scheduler moves on to fetch and dispatch the next instruction after removing the current instruction from the queue. Otherwise, the current instructed is executed normally.

In one implementation, the V_LSLS instruction counts the number of non-zeros in the values loaded into VGPRs. The V_LSLS instruction determines which instructions become redundant whenever the number of non-zeros in the loaded vector is less than a threshold. This determination is transferred to the skipQueue. The arguments r_size, r_offset1, r_offset2 and r_base of the v_lsls instruction allow the V_LSLS instruction to automatically generate the program counter offsets of the redundant MACs to store in the skipQueue. In one implementation, the arguments r_size, r_offset1, r_offset2 and r_base are programmed by a compiler based on the structure of the GEMM code. In one implementation, the skipQueue is implemented in the buffers of the LSLU. The size of the skipQueue determines the maximum number of MACs that can be skipped. Accordingly, in one implementation, the skipQueue is sized to accommodate the maximum block size expected to be encountered in an outer product implementation.

In one implementation, a DNN utilizes low precision operands. Utilizing low precision operands allows the threads in a wavefront to load more operand values and perform more MACs in a single instruction. For example, reducing precision to 8 bits from 32 bits can allow a thread to load four times as many matrix values per load instruction and operate on four of these values instead of a single value per MAC instruction. In the case where all values are required to be zero, the MAC becomes redundant if and only if all low precision values operated by it have zeros but the probability of encountering such a case can be quite low. Accordingly, in one implementation, a new threshold "intraMAC" is introduced to determine whether a value of a MAC operation is characterized as redundant. The new threshold "intraMAC" allows some lossiness to exist within a single MAC instruction of each thread and the MAC instruction can be skipped if the number of low precision non-zero values is less than intraMAC. The family of sparse load instructions introduced herein can be easily extended to reduced precision implementations.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a plurality of processing elements; and
control logic;
wherein the control logic is configured to:
load a plurality of input vector operands from a memory;
provide the plurality of input vector operands to a vector register file only when a number of non-zero values in the plurality of input vector operands is greater than or equal to a first threshold; and
responsive to the number of non-zero values in the plurality of input vector operands being greater than or equal to the first threshold, cause the plurality of input vector operands to be processed by the plurality of processing elements.

2. The system as recited in claim 1, wherein the system is configured to reduce at least one of power consumption and execution time when implementing a neural network by skipping processing associated with the plurality of input vector operands for one or more layers of the neural network.

3. The system as recited in claim 2, wherein a non-zero value is an absolute value which is greater than a second threshold.

4. The system as recited in claim 3, wherein the first threshold and the second threshold are programmable based on an error tolerance of a neural network.

5. The system as recited in claim 3, wherein the system is configured to set the first threshold and the second threshold to values which are based on an error tolerance of a neural network.

6. The system as recited in claim 2, wherein the control logic is further configured to store a program counter offset of an instruction processing a given input vector operand in a skip queue so that the instruction will not be executed, responsive to determining that the number of non-zero values in the given input vector operand is less than the first threshold.

7. The system as recited in claim 1, wherein responsive to the number of non-zero values being less than the first threshold, the control logic is configured to cause processing of the plurality of input vector operands to be skipped.

8. A method comprising:
loading a plurality of input vector operands from a memory;
determining, by control logic coupled to a plurality of processing elements, how many non-zero values are included in the plurality of input vector operands; and
providing the plurality of input vector operands to a vector register file only when a number of non-zero values in the plurality of input vector operands is greater than or equal to a first threshold.

9. The method as recited in claim 8, further comprising reducing at least one of power consumption and execution time when implementing a neural network by skipping processing associated with the plurality of input vector operands for one or more layers of the neural network.

10. The method as recited in claim 9, wherein a non-zero value is an absolute value which is greater than a second threshold.

11. The method as recited in claim 10, wherein the first threshold and the second threshold are programmable based on an error tolerance of a neural network.

12. The method as recited in claim 10, wherein responsive to determining that the number of non-zero values is less than the first threshold, the method comprises causing processing of the plurality of input vector operands to be skipped by the plurality of processing elements.

13. The method as recited in claim 9, further comprising storing a program counter offset of an instruction processing a given input vector operand in a skip queue responsive to determining that the number of non-zero values in the given input vector operand is less than the first threshold.

14. The method as recited in claim 8, further comprising performing, by a plurality of processing elements, a matrix multiplication operation to multiply a first set of input vector operands by a second set of input vector operands.

15. An apparatus comprising:
a plurality of processing elements;
a scheduler; and
a lossy sparse load unit;
wherein the lossy sparse load unit is configured to:
- load a plurality of input vector operands from a memory;
- determine how many non-zero values are included in the plurality of input vector operands; and
- provide the plurality of input vector operands to a vector register file only when a number of non-zero values in the plurality of input vector operands is greater than or equal to a first threshold.

16. The apparatus as recited in claim 15, wherein the apparatus is configured to reduce at least one of power consumption and execution time when implementing a neural network by skipping processing associated with the plurality of input vector operands for one or more layers of the neural network.

17. The apparatus as recited in claim 16, wherein a non-zero value is an absolute value which is greater than a second threshold.

18. The apparatus as recited in claim 17, wherein the first threshold and the second threshold are programmable based on an error tolerance of a neural network.

19. The apparatus as recited in claim 17, wherein the apparatus is configured to set the first threshold and the second threshold to values which are based on an error tolerance of a neural network.

20. The apparatus as recited in claim 15, wherein the processing performed by the plurality of processing elements comprises a matrix multiplication operation to multiply a first set of input vector operands by a second set of input vector operands.

* * * * *